United States Patent [19]

Baumberg

[11] Patent Number: 4,583,918

[45] Date of Patent: * Apr. 22, 1986

[54] ARRANGEMENT FOR ELEVATING LIQUID BY USE OF SOLAR AND/OR WIND ENERGY

[75] Inventor: Iosif Baumberg, Brooklyn, N.Y.

[73] Assignee: Danmine Siftware and Technology, Inc., Fair Lawn, N.J.

[*] Notice: The portion of the term of this patent subsequent to May 28, 2002 has been disclaimed.

[21] Appl. No.: 700,961

[22] Filed: Feb. 12, 1985

[51] Int. Cl.[4] ............................................. F04F 1/18
[52] U.S. Cl. .................................. 417/108; 417/379; 417/207; 60/398
[58] Field of Search ............... 417/108, 118, 55, 158, 417/197, 207–209, 379; 60/398

[56] References Cited

U.S. PATENT DOCUMENTS

| 1,154,745 | 9/1915 | Browne | 417/108 |
| 4,519,749 | 5/1985 | Baumberg | 417/158 |

Primary Examiner—Carroll B. Dority, Jr.
Attorney, Agent, or Firm—Ilya Zborovsky

[57] ABSTRACT

An arrangement for elevating liquid by the use of solar and/or wind energy having a pipe immersed in a liquid, a pipe directed upwardly from the surface of liquid and interconnection for entrapment of liquid, with a pressure differential and an air passage formed alternately and repetitively during presence of solar and/or wind energy, is additionally provided with an air purging element formed as a hydraulic valve with upper and lower interconnected pipes of which the upper pipe has an outlet located above the liquid level.

3 Claims, 6 Drawing Figures

ARRANGEMENT FOR ELEVATING LIQUID BY USE OF SOLAR AND/OR WIND ENERGY

BACKGROUND OF THE INVENTION

The present invention relates to an arrangement for elevating liquid by the use of solar and/or wind energy.

Arrangements of the above mentioned general type are known in the art. One of such arrangements is disclosed for example in the U.S. patent application Ser. No. 441,740 filed Nov. 15, 1982, now U.S. Pat. No. 4,519,749. In this arrangement a first pipe immersed in a liquid is connected by another pipe with a second pipe which is directed upwardly with entrapment of the liquid in the interconnection, and means causing a pressure differential and forming an air passage alternately and repetitively during the presence of solar and/or wind energy. The above mentioned arrangement operates very effectively. However, liquid in the second pipe can slowly flow downwardly into the interconnection in the absence of solar and/or wind action and at least partially close the same thus reducing efficiency of the arrangement. It is therefore desirable to eliminate this disadvantage.

SUMMARY OF THE INVENTION

Accordingly, it is an object of the present invention to provide an arrangement which avoids the disadvantages of the prior art.

In keeping with these objects and with others which will become apparent hereinafter, one feature of the present invention resides, briefly stated, in an arrangement for elevating liquids by the use of solar and/or wind energy, in which purging means is provided for air purging of the pressure means and including an hydraulic valve connected with an air supply pipe and having upper and lower open pipes connected with one another.

When the arrangement is designed in accordance with the present invention, it provides for purging the arrangement, thus preventing its blocking and reduction of its efficiency.

The novel features which are considered as characteristic for the present invention are set forth in particular in the appended claims. The invention itself however will be best understood from the following description of a preferred embodiment which is accompanied by the following drawing.

DESCRIPTION OF PREFERRED EMBODIMENTS

Figure 1A:
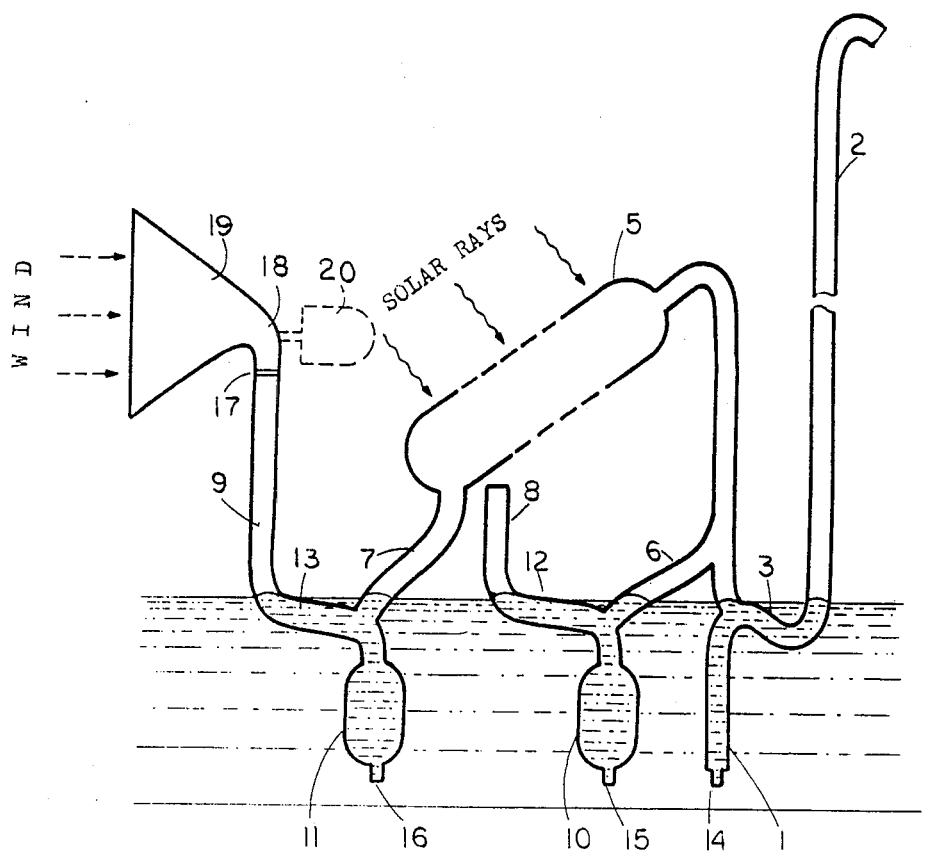
FIGS. 1a–1d are views showing an arrangement in accordance with the present embodiment in consecutive stages of its operation.

An arrangement for elevating liquids by the use of solar and/or wind energy in accordance with the present invention has a liquid supply pipe 1 with a lower end introducable into a liquid. The upper end of the supply pipe 1 is connected with a lower end of a delivery pipe 2 by an inclined pipe 3. The axes of these pipes are located in the same plane. The upper end of the supply pipe 1 is located higher than the lower end of the delivery pipe 2. The upper end of the supply pipe 1 also forms an air port. The upper end of the delivery pipe 2 forms a liquid discharge port.

A connecting part of the pipes 1 and 2 is connected by an air supply pipe 4 with an upper part of a heat-exchanger 5 which forms means for forming pressure differential between the air port and the liquid discharge port. Connecting pipes 6 and 7 connect the upper part of a container of the heat-exchanger and the lower part of the same with purging means which include first and second identical hydraulic valves. Each hydraulic valve includes an upper pipe 8,9 and a lower pipe 10,11 respectively, located vertically and connected with one another by horizontal or inclined connecting pipes 12 and 13 respectively. Lower ends of the pipes 1,10 and 11 are provided cross section limiting members 14,15,16 formed as pipe portions of a smaller cross section.

The second hydraulic valve and particularly the upper end of its pipe 9 is connected via a pivot joint 17 and a bend 18 with a funnel-shaped diffuser 19. A wind vane 20 is connected with the diffuser 19 for driving the diffuser.

Figure 2:
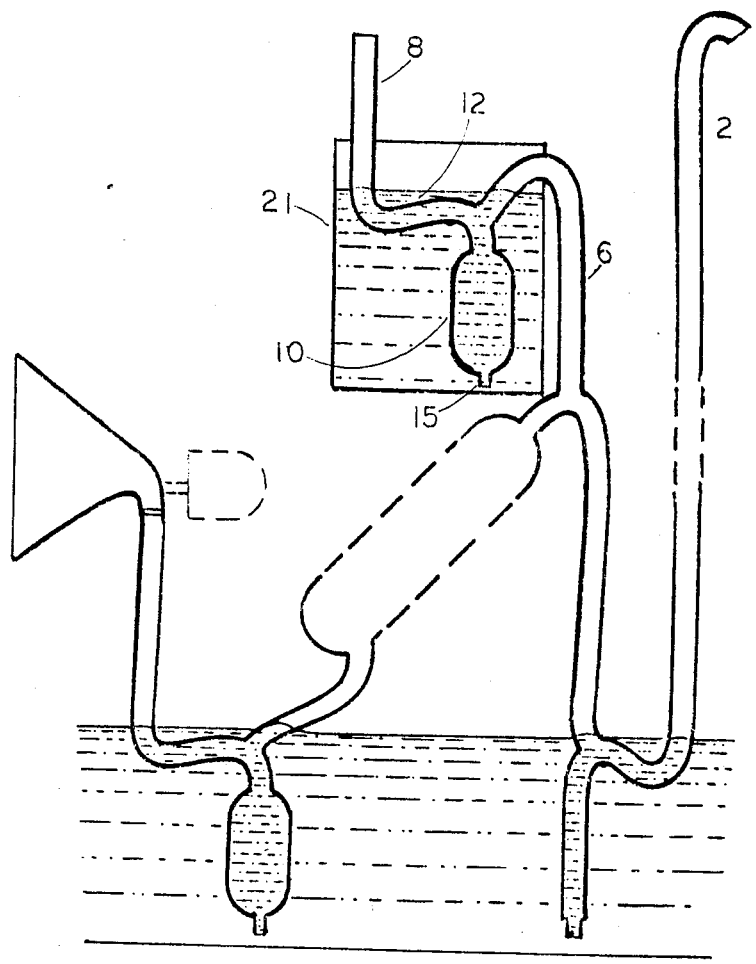
FIG. 2 is a view showing the inventive arrangement in accordance with the second embodiment of the present invention.

In accordance with another embodiment of the invention shown in FIG. 2, an additional container 21 with liquid is provided. It is located higher than the container of the heat-exchanger 5. The first hydraulic valve including the pipes 8,10,12 and a cross section limiting member 15, is accommodated in the container 21.

The arrangement in accordance with the present invention operates in the following manner.

The arrangement is immersed into a liquid to be elevated, for example water, to such a level that the inclined pipe 3 and the pipes 12 and 13 are of the hydraulic valves are immersed in the liquid. The liquid passes through the cross section limiting members 14,15, 16 and fill the pipes 1,3,10,12,11 and 13 as shown in FIG. 1a. As a result of this, the heat exchanger is isolated from the surroundings. The condition of FIG. 1a corresponds to the condition in point A on the diagram of thermodynamic condition of FIG. 3, at which the air pressure inside the heat exchanger 5 equals to the outside atmospheric pressure. The liquid level in the pipes 2,8,9 coincides with the liquid level in a reservoir with liquid to be elevated.

As a result of heating of air in the heat exchanger uner the action of solar energy or another source, the air pressure in it increases and air displaces the liquid from the inclined pipe 3 into the delivery pipe 2, from the upper part of the supply pipe 1 into its lower part, and from the lower part of the supply pipe 1 through the cross section limiting member 14 into the reservoir of liquid. Analogous processes take place in the hydraulic valves. The sizes of the respective parts of the arrangement are selected so that the height of a cut-off liquid portion in the delivery pipe 2 is smaller than the height of the supply pipe 1, and the quantity of liquid which is cut-off by air bubbles in each hydraulic valve is sufficient for formation in each of the vertical pipes 8 and 9 of liquid portions which are higher that the cut-off portions of liquid in the delivery pipe 2, and the quantity of air supplied from the heat-exchanger 5 into the pipes 1,3,10, 12,11 and 13 and required for displacing of the respective liquid portions into the pipes 2,8,9 has a considerably smaller volume than the total volume of air in the heat-exchanger 5.

Figure 1B:
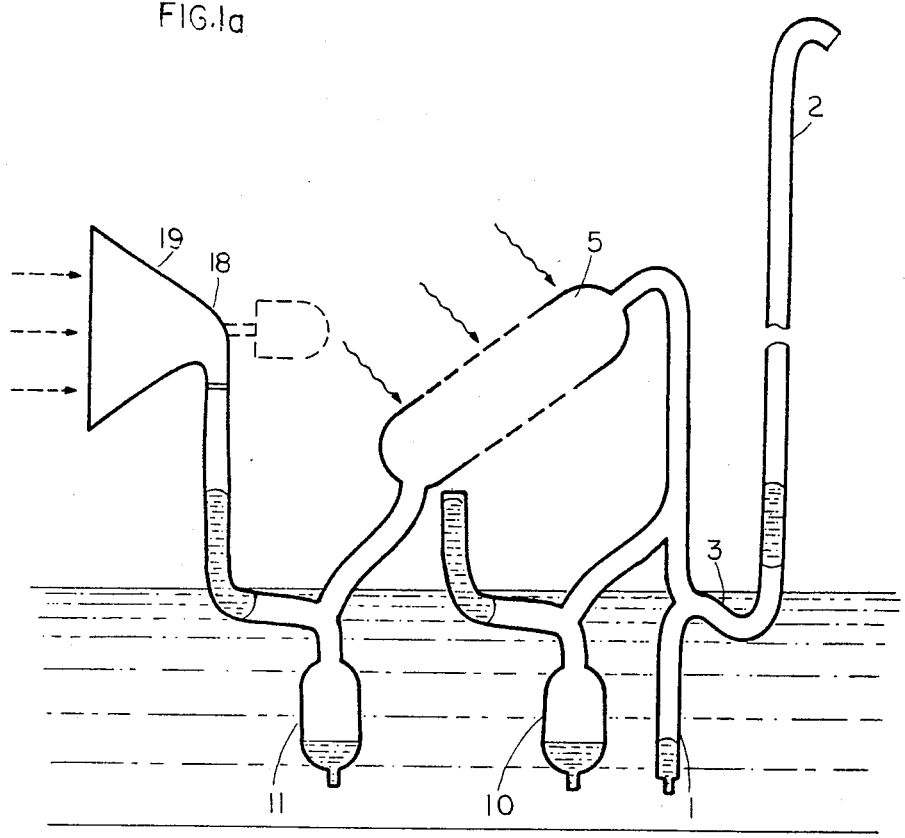

Because of this, after formation of a liquid portion in the delivery pipe 2, increase of the height of liquid column in the pipes 8 and 9 will finish. Thus the process of formation of liquid portions in the pipes 2,8 and 9 takes place with a practically constant volume, and heating of air in the heat-exchanger by solar energy (or other energy) takes place in the transition AB in the diagram of FIG. 3. Thermodynamic condition in the point A corresponds to the system condition shown in FIG. 1a, and thermodynamic condition in the point B corresponds to the system condition shown in FIG. 1b. Actual values of the levels of lowering of liquid in the pipes 1,10 and 11 and values of height of elevating of the liquid portions in the pipes 8,9 of the hydraulic valves are determined not only by hydrostatic pressure of the formed liquid portion in the pipe 2, but also by value of dynamic pressure $P_1$ in FIG. 3 of air required for displacement of a liquid portion upwardly through the pipe 2 with overcoming of resistance in the latter.

Figure 1C:
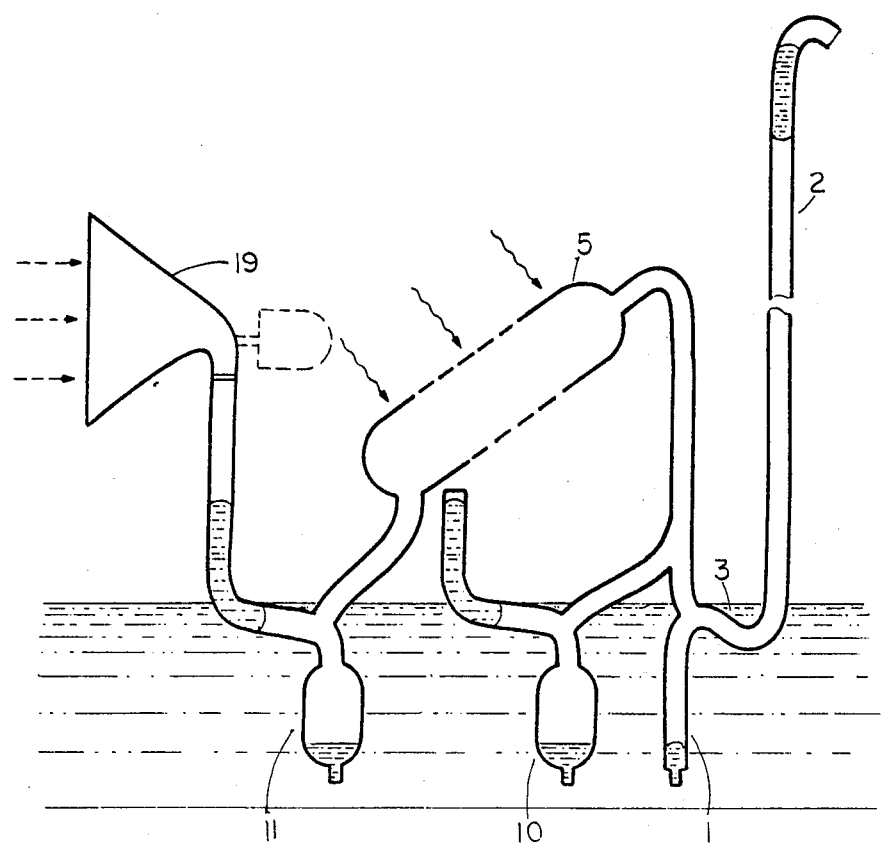
Figure 1D:
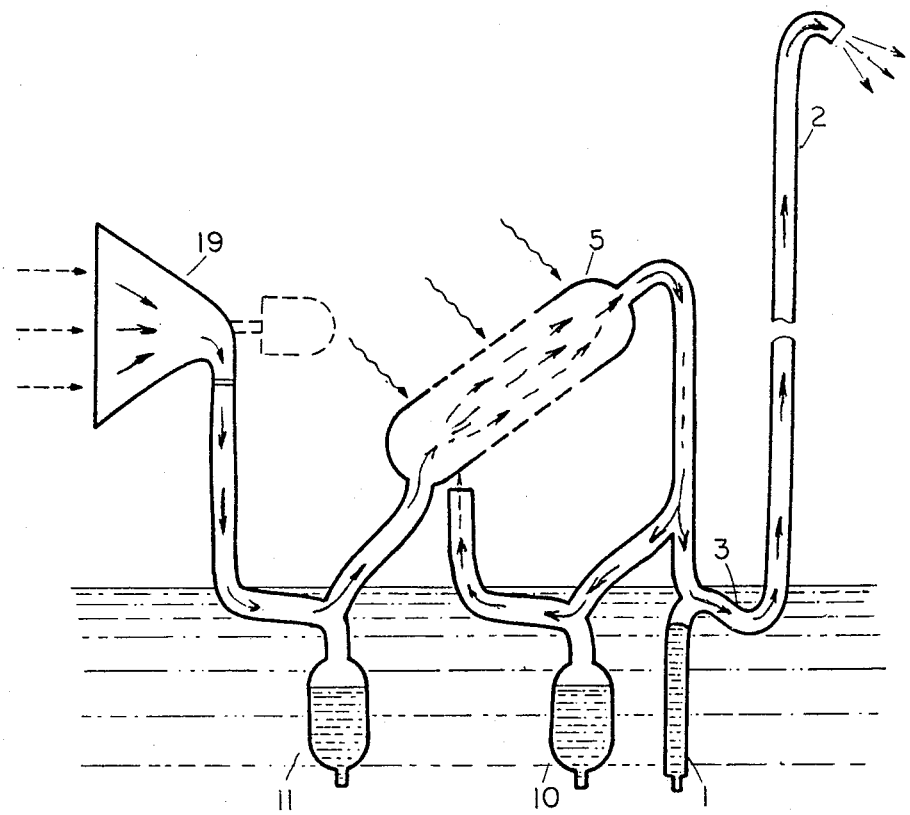
Figure 3:
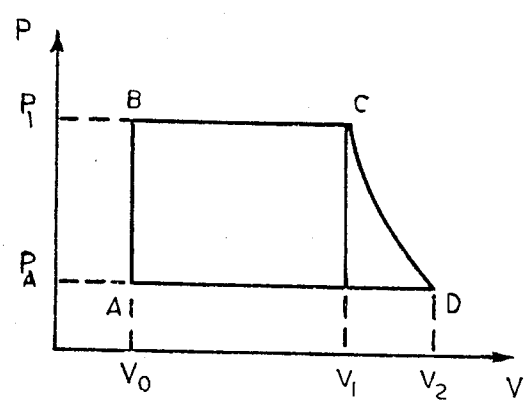
FIG. 3 is a view showing a cycle diagram of operation of the inventive arrangement.

Further absorption of energy by the heat-exchanger 5 leads to expansion of air in the latter with a constant temperature and pressure, isotherm-isobar BC in FIG. 3 and consists of expansion of air and energy consumption to displace the cut-off liquid portion upwardly through the pipe 2, as shown in FIG. 1c. Further supply of energy through the heat exchanger leads to throwing of the elevated liquid portion through the upper opening of the pipe 2, which is point C in the diagram of FIG. 3. Discharge of the liquid portion through the upper opening of the pipe 2 leads to loss of hermetization of the system, drop of pressure in the system to the atmospheric pressure and discharge of a portion of air from the heat-exchanger into surroundings, flowing of the liquid from the pipes 8 and 12 into the pipe 10 and from the pipes 9 and 13 into the pipe 11. Since the value of liquid columns in the pipes 8 and 9 is equal to the value of depth of lowering of the liquid level in the pipes 10 and 11 reached by the time before discharge of liquid through the upper opening of the pipe 2, and the cross sectional areas of the pipes 10 and 11 are greater than the cross sectional areas of the pipes 8,12 and 9,13, the volumes of liquid in the pipes 8,12 and 9,13 will be smaller than the volume of air in the pipes 10 and 11. The liquid which has been flown out from the pipes 8,12 and 9,13 does not fill liquid-free spaces in the pipes 10 and 11 and as a result of this the hydraulic valves will be temporarily open as shown in FIG. 1d.

As a result of discharge of the elevated liquid portion through the upper opening of the pipe 2, adiabatic expansion of air and decrease of its temperature take place in the heat exchanger. However, this process is not sufficient for returning the system to its initial condition identified by point A in the diagram of FIG. 3. and in FIG. 1a. From the time moment of complete discharge of the elevated liquid portion from the delivery pipe 2 and flowing off of the liquid from the pipes 8,12 and 9,13 respectively into the pipes 10 and 11, and till the time moment of filling of the pipes 1,3,10,12,11 and 13 with liquid, the system remains without hermetization. With the aid of wind, through the funnel-shaped diffuser 19, the bend 18 and the pipes 9,13,7,4,6,12,8,3 and 2, purging by air of the interior of the heat-exchanger takes place, as shown in FIG. 1d. The cross section limiting members 14,15 and 16 are needed for providing a required time interval between the above described time moments of the beginning and the end of hermetization loss of the system, and therefore of purging.

During filling of the pipes 3,12 and 13, the initial condition of the system and its readiness for performing a new cycle of liquid elevation is restored. The arrangement can operate even without the first hydraulic valve formed by the pipes 8,10 and 12 and connnected with the arrangement by the pipe 6. However, in the process of elevation of liquid through the delivery pipe 2 and after discharge of the liquid throught its upper opening, flowing out of a portion of liquid from the walls of the deliver pipe into the inclined pipe 3 takes place with the reduction of the cross section of the latter. This decreases the efficiency of purging of the heat-exchanger. The provision of the first hydraulic valve increases the efficiency of purging of the heat-exchanger and provides for a possibility to increase the output of the arrangement.

Work A performed by the arrangement during one cycle of liquid elevation is $$A = \int_{V_0}^{V_1} P_2 \, dV = P_2 (V_1 - V_0)$$

wherein:

$P_2$ is a pressure of air in the system during movement of a portion of cut-off liquid upwardly in the delivery pipe 2; and $V_1 - V_o$ is an inner volume of the delivery pipe.

Contrary to the known arrangements, the height of liquid elevation in the inventive arrangement is determined not by a temperature difference between a heater and a cooler, but by a volume of liquid of the heat-exchanger. This makes possible to elevate liquid to any height with small temperature differences. The operation of the inventive arrangement can be compared with the operation of a steam engine or a two-cycle engine. The process of heating of a working medium, for example water, in a steam engine corresponds to the process of formation of the liquid portions in the pipes 2,8 and 9 and takes place in accordance with an isochore AB (FIG.3). The process of conversion during which a formed steam fills the working cylinder and displaces a piston in a steam engine corresponds to the process of displacement of the cut off liquid portion upwardly through the pipe 2. This work is a work of filling and it takes place in accordance with the isotherm-isobar BC of FIG.3. The subsequent process in the inventive arrangement takes place analogously to the processes which take place in the two-cycle internal combustion engine. During a working stroke of this engine, a piston is displaced by expanding combustion products and reaches a discharge slot through which the gases discharge from the cylinder. This corresponds in the inventive arrangement to flowing out of a portion of air from the heat-exchanger through the upper opening of the delivery pipe 2 during subsequent time after discharge of the elevated liquid portion. In the two-stroke combustion engine, after dischargae of the gases, air compressed in the crank chamber during the working stroke purges the cylinder through the purging window. Analogous process takes place in the inventive arrangement, in which purging of the interior of the heat-exchanger takes place under the action of wind through the upper end of the upper pipe 8 (purging window) of the first hydraulic valve and the open end of the delivery pipe 2. With the aid of the wind vane 20, the funnel-shaped member 19 is oriented with its open end in accordance with the direction of wind.

In the embodiment shown in FIG. 2, the first hydraulic valve including the pipes 8,12 and 10 is located higher than the upper part of the heat-exchanger and accommodated in the container 21 filled with liquid. The operation of this arrangement is similar to the operation of the arrangment of FIG. 1. The difference, however, is that in the event of a weak wind or its absence, purging of the heat-exchanger takes place because of the difference in densities of heated air in the heat-exchanger and the denser surrounding air. The denser air is supplied through the second hydraulic valve into the lower part of the heat-exchanger and displace the heated air from the upper part of the latter through the first hydraulic valve located above the heat-exchanger.

For increasing the efficiency of the arrangement, greenhouse effect can be utilized. The heat-exchanger can be accommodated in a case which is transparent for solar radiation and not transparent for long=wave radiation, for example of glass or transparent plastic. For increasing the dependency of operation of the arrangment from wind strength, the height of the heat-exchanger is to be increased.

The invention is not limited to the details shown since various modifications and structural changes are possible without departing in any way from the spirit of the invention.

What is desired to be protected by Letters Patent is set forth in particular in the appended claims.

I claim:

1. An arrangement for elevating liquid by the use of solar and/or wind energy, comprising
    a first pipe to be immersed in a liquid and extending upwardly in the liquid upon immersion therein:
    a second pipe to be directed upwardly from a surface of the liquid;
    a third pipe connecting an upper end of said first pipe and a lower end of said second pipe so that an interconnection of said third pipe with said first pipe is located higher than an interconnection of said third pipe with said second pipe to provide entrapment of liquid in said third pipe upon immersion of said first pipe into the liquid up to said first-mentioned interconnection, said first pipe having a liquid inlet at its lower end and an air port at its upper end;
    pressure means for applying a pressure differential between said air port and said discharge port and responsive to the presence of liquid in said third pipe such that pressure from said pressure differential means builds up when said third pipe is closed off with liquid and decreases upon voiding of said third pipe and said second pipe;
    an air supply pipe connected with said air port of said first pipe and said pressure means and connected with said first pipe and said third pipe so as to form a tee, thereby to form a separate liquid portion in said first pipe in response to said pressure differential and to provide an air passage to said pressure means via said air port upon discharge of said liquid portion at said discharge port, said pressure differential and said air passage being formed alternately and repetitively during the presence of solar and-/or wind energy; and
    purging means for air purging of said pressure means and including an hydraulic valve connected with said air supply pipe and having upper and lower open pipes connected with one another, wherein said upper pipe has an outlet arranged to be above the surface of the liquid.

2. An arrangement as defined in claim 1, wherein said pressure means includes a heat-exchanger having upper and lower ends, said air supply pipe having a lower part located under said upper end of said heat-exhanger, said hydraulic valve being connected with said lower part of said air supply pipe.

3. An arrangement as defined in claim 1, wherein said pressure means includes a heat-exchanger having upper and lower ends, said air supply pipe having a part extending upwardly of said upper end of said heat-exchanger, said hydraulic valve being connected with said upper part of said air supply pipe and being accommodated in a container filled with a liquid.

* * * * *